Figure 1:
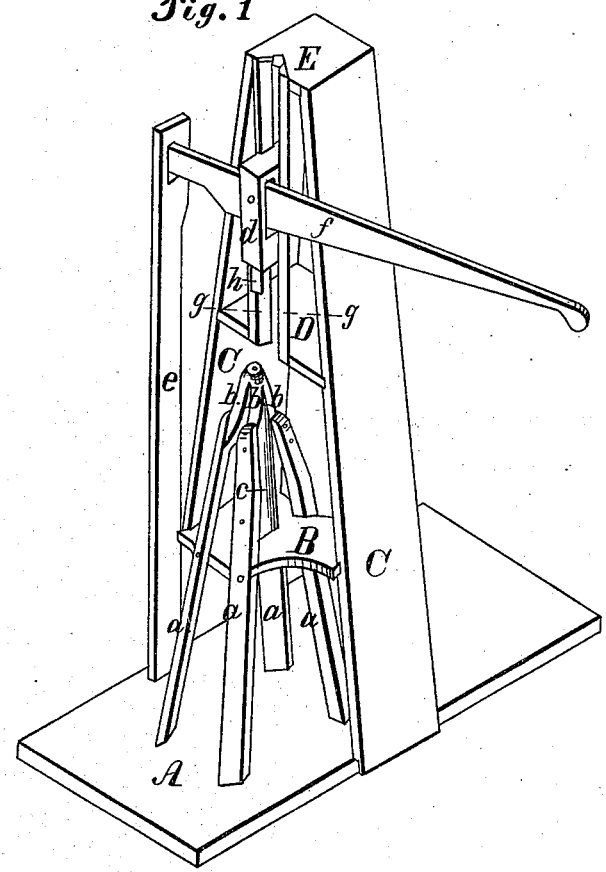
Figure 3:
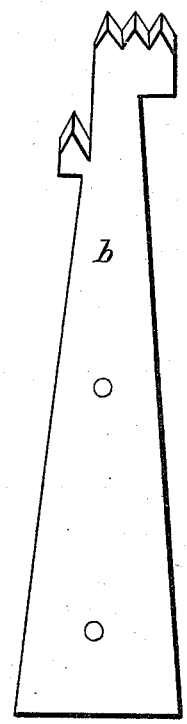
Figure 2:
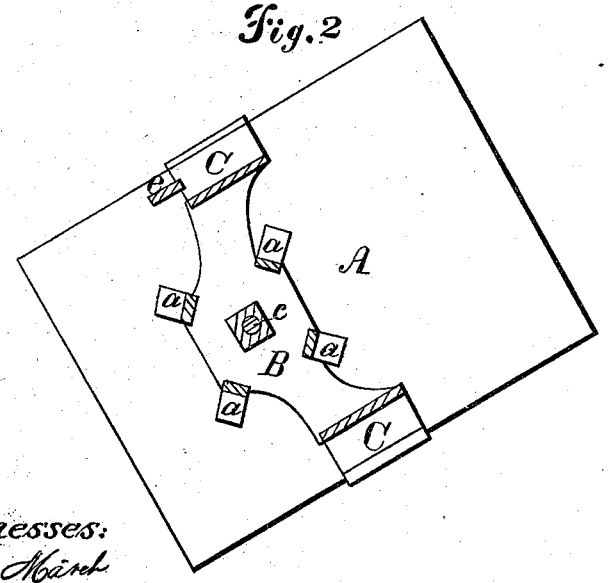
Figure 4:
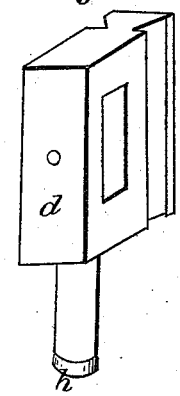

D. BAKER.
Corn Sheller.

No. 81,458.

Patented Aug. 25, 1868.

Witnesses:
David March
David Brewer

Inventor:
Daniel Baker

UNITED STATES PATENT OFFICE.

DANIEL BACON, OF BREWERSVILLE, INDIANA.

IMPROVEMENT IN CORN-SHELLERS.

Specification forming part of Letters Patent No. 81,458, dated August 25, 1868.

*To all whom it may concern:*

Be it known that I, DANIEL BACON, of Brewersville, in the county of Jennings and State of Indiana, have invented a new and useful Machine for Shelling Corn; and I do hereby declare that the following is a full, clear, and exact description of the construction and operation of the same, reference being had to the annexed drawings, making a part of this specification, in which—

Figure I is a perspective view; Fig. II, a horizontal section; Fig. III, a full-sized plan of the teeth; Fig. IV, plan of the follower $d$.

A A, platform; B B, supporter of springs and frame; C C, uprights of frame; D, center cross-piece; E, top cross-piece; $a\,a\,a\,a$, springs; $b\,b\,b\,b$, teeth attached to springs $a$; (see Fig. III;) springs and teeth so adjusted that the teeth shall form a hole three-fourths of an inch in diameter; $c$, tube two inches diameter, which may be made of wood or metal, and may be passed through platform A and through floor, to separate the cobs from the corn; $d$, follower; $e$, fulcrum, attached to platform A by hinge; $f$, lever; $g\,g$, slides for follower.

The teeth, Fig. III, are made of steel, wrought or malleable iron, or other hard substance.

Fig. IV represents the follower, which should have a ring on it, to prevent splitting.

The point of the ear of corn is placed within the teeth $b\,b\,b\,b$, and the end of the follower $h$, in Fig. I, is placed on the cob at the stem end, and it is forced through the teeth by one downward motion of the lever, effectually shelling the corn from the cob.

For the more full method of construction, I refer to the annexed drawings.

What I claim as my invention, and desire to secure by Letters Patent, is—

The lever $f$, plunger $d$, teeth $b\,b$, springs $a\,a$, and platform A, constructed and operated substantially as shown and described, for the purposes set forth.

DANIEL BACON.

Witnesses:
 DAVID MARSH,
 DAVID BREWER.